United States Patent [19]

Hetherington et al.

[11] 4,215,721

[45] Aug. 5, 1980

[54] MODULAR MULTIPLE-FLUID COMPONENT SELECTION AND DELIVERY SYSTEM

[75] Inventors: Robert D. Hetherington, Sunland; David W. Goelz, Burbank, both of Calif.

[73] Assignee: Poly-Glas Systems, Sun Valley, Calif.

[21] Appl. No.: 968,609

[22] Filed: Dec. 11, 1978

[51] Int. Cl.² .......................................... F16K 11/22
[52] U.S. Cl. .................................. 137/606; 137/240; 137/884; 137/887; 239/112
[58] Field of Search ............... 137/240, 606, 884, 887; 239/112, 305

[56] References Cited

U.S. PATENT DOCUMENTS

| | | | |
|---|---|---|---|
| 3,234,963 | 2/1966 | Lyon | 137/884 |
| 3,348,774 | 10/1967 | Wiggins | 239/124 X |
| 3,443,578 | 5/1969 | Hedin | 137/240 |
| 3,509,904 | 5/1970 | Olson | 137/884 X |
| 3,572,366 | 3/1971 | Wiggins | 137/240 |
| 3,674,205 | 7/1972 | Kock | 137/240 X |

FOREIGN PATENT DOCUMENTS 2145858 2/1973 France ...................................... 137/884

*Primary Examiner*—Gerald A. Michalsky

[57] ABSTRACT

A modular multiple-fluid component selection and delivery system comprised of a main block having a centrally located main passageway intersected by a plurality of secondary passageways. Plug valves are inserted in bores in the block which intersect each respective main and secondary passageway. A valve at the entrance to the main passageway permits flushing the system with a solvent for cleaning the main passageway and spray gun. A check valve at the entrance to the main passageway prevents a backup of fluid components into the solvent supply system. The secondary passageway exits at the sides of the block to which are attached hose connecting fittings. The main passageway terminates in the opposite end of the block in threads for attachment to a main hose to a spray gun for spraying a fluid component such as paint. The exit end of the main passageway also provides a shoulder for an aligning sleeve for attachment of successive blocks in modular form to add additional valve connections for controlling the flow of additional fluid components. Each additional auxiliary block stacks end to end with the previous block with main passageways in each block being aligned by aligning sleeves. Studs of appropriate length are provided according to the number of auxiliary blocks stacked end to end to secure and clamp the blocks to the main manifold or block. Each successive auxiliary block provides control and delivery of two additional fluid components.

10 Claims, 5 Drawing Figures

MODULAR MULTIPLE-FLUID COMPONENT SELECTION AND DELIVERY SYSTEM

BACKGROUND OF THE INVENTION

This invention relates to fluid component delivery systems and more particularly relates to a modular multiple-fluid component selection and delivery system.

Systems for providing for selection of one or more of a plurality of fluid components to be delivered to a main conduit are known in the art. Some of these are in the form of a circular arrangement with valves controlling the flow to a main hose or conduit at the center of the circle. Hose connections are provided at the outer periphery of the circle for connecting fluid components to the main conduit at the center of the circle. One problem with this arrangement is that the supply valves for controlling the flow of the fluid components to the main conduit of necessity are spaced a considerable distance from the main conduit.

Another type of device provides an end-to-end stacked arrangement of valves which are pneumatically operated for controlling the flow of the fluid components. This system provides a paint, or other fluid component, supply transverse to a main passageway which has a purging or solvent supply system upstream of the paint supply valve system. A complicating factor of this arrangement is the complex valving system, including the pneumatically operated valves.

Other systems include a plurality of parallel conduits having valves terminating in a manifold going to a main conduit. As was stated previously an obvious disadvantage of this system is the remoteness of the valve systems from the main passageway or conduit.

SUMMARY OF THE INVENTION

The purpose of the present invention is to provide a simple, uncomplicated, modular, multiple-fluid component selection and supply system.

The present invention provides a plurality of manifolds or blocks which can be stacked end to end to provide a plurality of fluid component selection valves. The system is simple in construction and allows a simple method for adding as many additional valves to increase the multiple fluid components as needed. Each block has a main passageway and two secondary passageways intersecting the main passageway. The main passageway exits at planar ends of the block while the secondary passageways exit at the sides. Bores passing through the blocks perpendicular to the supply passageways permit installation of plug valves to control the flow of the paint or fluid components in each passageway. The output end of each main passageway in each block is threaded for installation of a main hose fitting or connection. The blocks can be stacked by simply placing them end to end and with an alignment sleeve inserted between the transition of the main passageway from one block to the next successive block and securely clamping them together with an appropriate length stud.

An O-ring in the planar face of each respective block seals the transition from the main passageway in one block to the main passageway in the next successive block. Each block has a small hole passing entirely through the block parallel with the main passageway for securing and clamping the respective blocks in a stacked arrangement with the stud. The stud length is changed to accommodate added blocks to provide for delivery and control of additional fluid components. As many blocks as needed can be connected end to end in a stacked arrangement to provide control of any number of fluid components. The bores for the plug valves are placed in the secondary passageways as close as possible to the main passageway to minimize paint loss during cleaning of the system.

This system permits easy conversion from one color to another by simply turning off one valve and purging the system by operation of the valve in the main passageway to clean the main passageway and a spray gun attached thereto by a suitable hose. Since the paint supply valves are plug valves retained in bores, immediately adjacent to the main passageway, the solvent at the inlet end of the main passageway substantially cleans the entire downstream face of the plug valve and secondary passageway, minimizing the loss of paint as well as contamination of the other paints. After purging the gun with solvent the solvent valve is closed and another color is selected by turning the appropriate plug valve to the on position to open one of the alternate secondary passageways. The modular construction of the system permits the addition of more colors, if desired, as well as allowing removal of auxiliary blocks for cleaning, repair and maintenance, if desired. Valves, hose fittings and entire blocks may be easily removed and replaced with minimum disassembly of the system.

Since the paint colors are generally at higher pressure than the purging solvent supply, a check valve is provided at the entrance to the main passageway adjacent to the solvent valve to prevent backup of paint into the solvent supply system.

The successive stacked arrangement of blocks permits simple, easy removal or addition of an auxiliary block by unscrewing the stud and adding or removing the auxiliary manifold or block and installing shorter or longer studs as needed to clamp the entire assembly together. The entire system is compact and easy to assemble and use and can be mounted in any variety of positions and locations.

It is one object of the present invention to provide a fluid component selection and supply system which is modular in design.

Another object of the present invention is to provide a multiple fluid component selection and supply system which is relatively simple in construction.

Yet another object of the present invention is to provide a multiple fluid component supply system having close coupling between the supply valves and the main passageway.

Still another object of the present invention is to provide a multiple fluid component supply system which is easy to assemble and maintain.

Other objects, advantages and novel features of the invention will become apparent from the following detailed description of the invention when considered in conjunction with the accompanying drawings wherein like reference numbers identify like parts throughout.

DETAILED DESCRIPTION OF THE PREFERRED EMBODIMENT

Figure 1:
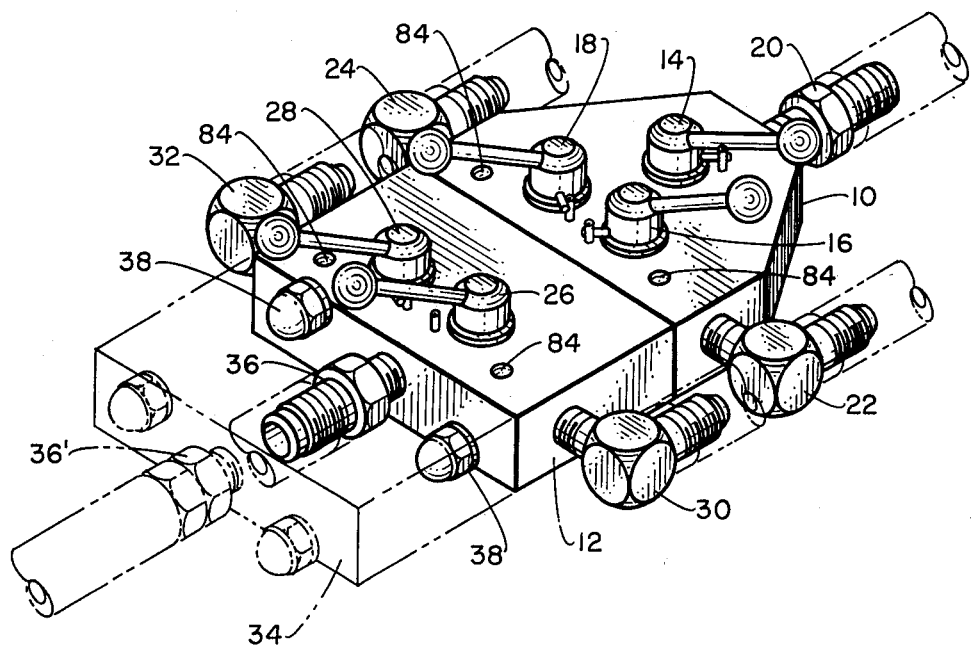
FIG. 1 is a perspective view of the modular multiple fluid selection and delivery system.

Referring now to the figures, there is shown a main color manifold block or module 10 connected end to end with an auxiliary color manifold block or module 12 for selective control and supply of a plurality of fluid components, such as paints. The main color manifold 10 has a solvent valve 14 and two paint color select valves 16 and 18. Solvent is supplied to a hose connection 20 which includes a check valve to prevent contamination of the lower pressure solvent system with paint. Hose fittings or connections 22 and 24 provide for connection of a paint or other fluid component supply system to valve 16 and 18.

Figure 2:
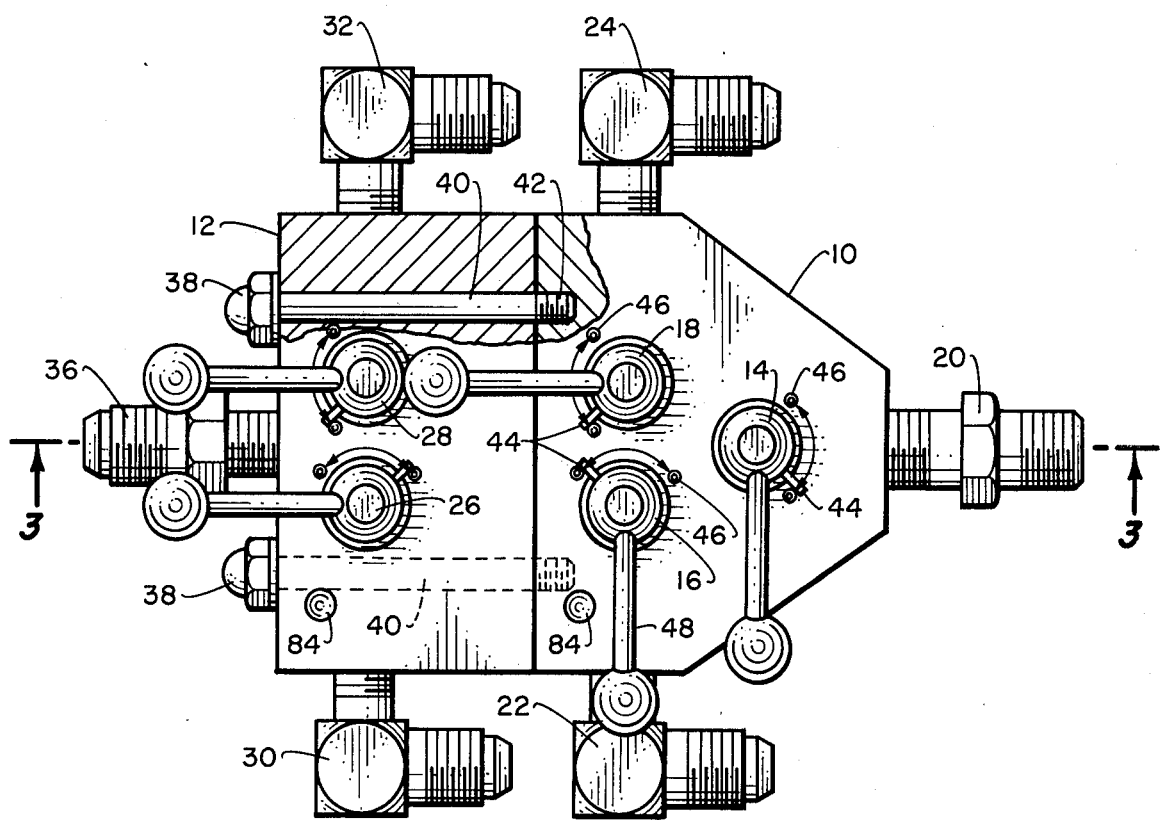
FIG. 2 is a front elevational view of the modular multiple fluid component selection and delivery system.
Figure 3:
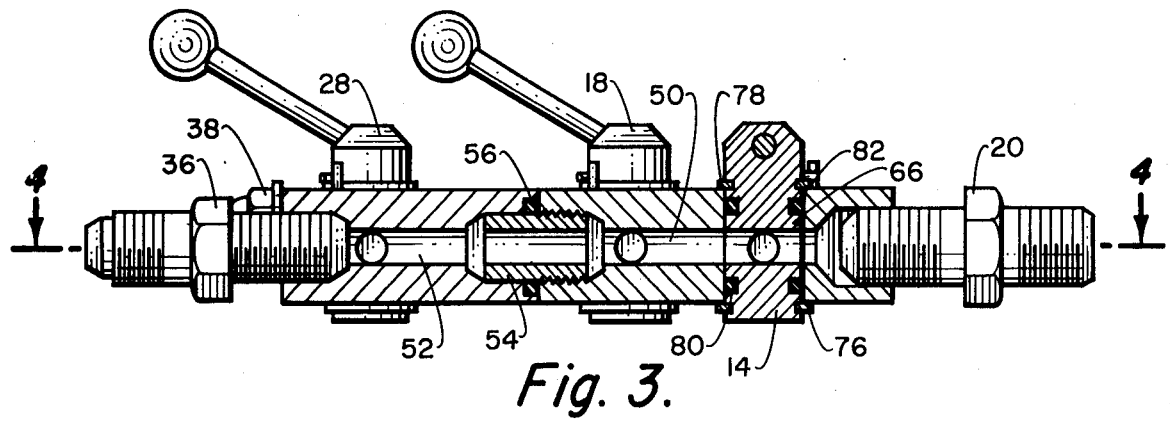
FIG. 3 is a sectional view of the modular multiple fluid component supply system taken at 3—3 of FIG. 2.
Figure 4:
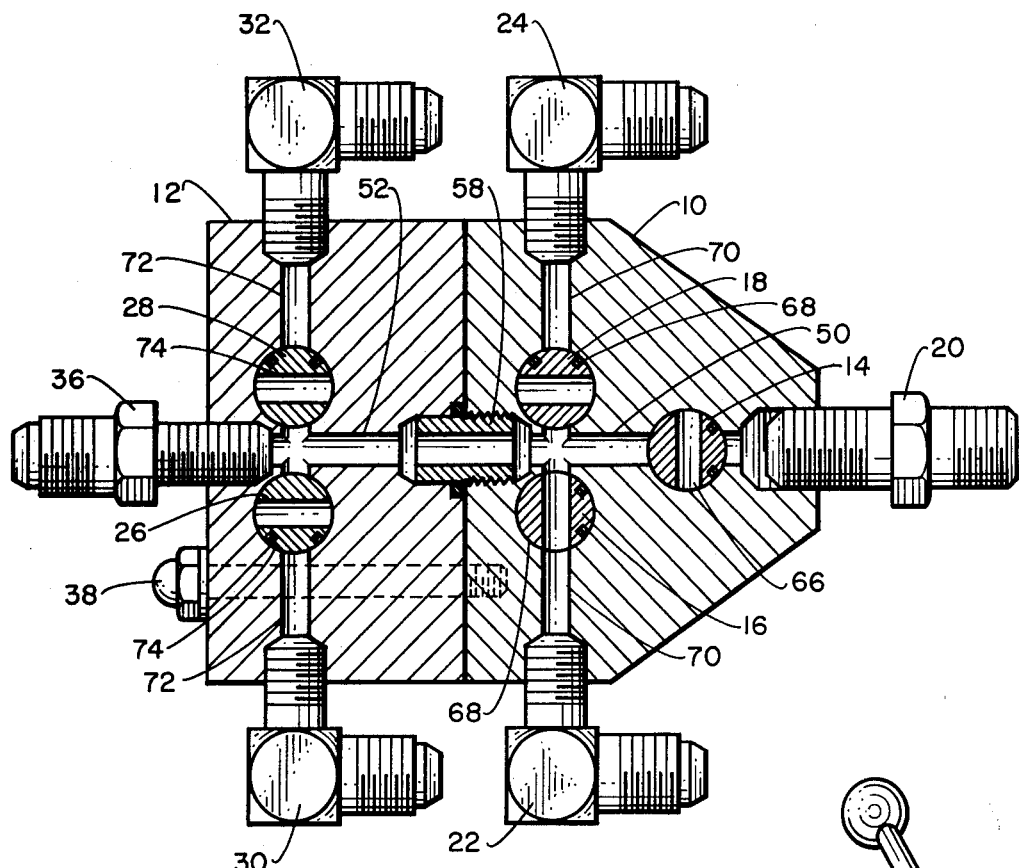
FIG. 4 is a sectional view of the modular multiple fluid component selection and delivery system taken at 4—4 of FIG. 3.

The auxiliary color manifold block 12 provides for an additional pair of color control valves 26 and 28 through hose fittings 30 and 32 expanding the color control system to four. The connection of additional auxiliary color manifold blocks is illustrated by the phantom lines 34. A hose fitting 36 is provided for a main hose connection to a spray gun or other type of spray head (not shown). The auxiliary block 12 is secured to the main manifold block 10 by studs 40 (FIG. 2) and cap nuts 38. Studs 40 of appropriate length are provided according to the number of auxiliary blocks connected end to end. The stud 40 passes entirely through the auxiliary blocks into threaded holes 42 in the main manifold block 10. The plug valves 14, 16, 18, 26 and 28 are all identical and are operated by a 90° rotation from a horizontal to a vertical position. A pin 44 on each valve body is adapted to abut stops 46 to limit rotational travel of each valve to provide a positive open or closed position. In FIG. 2 plug valves 14, 18, 26 and 28 are shown in the closed position with valve 16 in the open position. Each valve is in the open position when the handle 48 of the respective valve is aligned with the passageway through which flow is being controlled. In the main manifold block 10 a main passageway 50 is provided for flow to the hose fitting 36 and subsequently to the spray gun. Each auxiliary block 12 has a corresponding main passageway 52 in alignment with the main passageway 50 of the main manifold 10. The outlet end of the main passageway of each manifold including the main and auxiliary manifolds is held in alignment by a sleeve 54 passing partway into each manifold into abutment with shoulders in the main passageway. The connection between main passageways 50 and 52 in adjacent manifolds is sealed by an O-ring 56. The outlet end of the main passageway of each manifold is provided with a threaded portion 58 so that hose fitting 36 can be installed at the end of the main passageway in the last manifold of the assembly.

A sleeve 58 is needed between the main passageway from one manifold to the succeeding manifold. Thus, if there are ten manifolds in succession, there would be nine sleeves connecting the transition of the main passageway from each manifold to the succeeding manifold. The last manifold would have the fitting 36 installed as illustrated in FIG. 1 at 36'.

Figure 5:
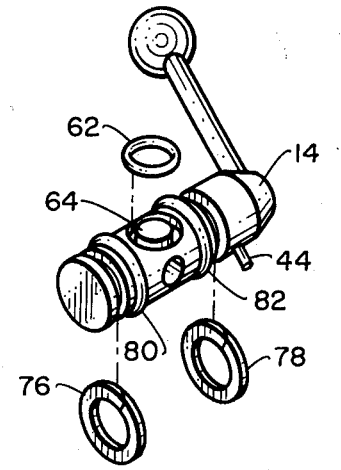
FIG. 5 is a detail view of the plug valves used in the modular multiple fluid component control system.

The modular multi-color control system of the invention is relatively simple in construction, allowing easy removal and replacement of parts without disassembly of the entire system (i.e. minimizing disassembly). For example, as shown in FIG. 5, each plug valve 60 has an O-ring seal 62 around a face 64 which seals the respective passageway of the assembly. The plug valve 14 is retained in a bore 66 intersecting the main passageway 50 in the main manifold 10 or bores 68 intersecting secondary passageways 70 which intersect the main passageway 50. The bores 68 are placed as close as possible to the intersection of the secondary and main passageways to minimize component loss during flushing and contamination of succeeding colors selected. The auxiliary manifold 12 also has secondary passageways 72 intersecting the main passageway 52 with plug valves installed in bores 74 placed as close as possible to the extension of the main passageway 52.

If a plug valve should fail or be defective, then it can be easily removed without disassembling the system by removing the lock ring 76 and pulling the plug valve out of the bore. A retaining ring 78 is provided at the top of the plug valve 50 to maintain the position of the valve in the bore 66. Additional O-ring seals 80 and 82 are provided around the body of the plug valve as shown. Back up rings (not shown) may be used with O-rings 80 and 82 for certain applications, environments or working pressures where necessary to improve the seal.

In operation a plurality of fluid components supply systems are connected to each respective fitting or nipple 22, 24, 30 and 32 which are usually several different paint colors. Sockets 84 adjacent to each respective plug valve are provided for holding a small amount of paint as an indication of the color connected to that valve. To select a color the plug valve for that color is rotated 90° until limit pin 44 abuts the stop 46 with the handle 48 aligned with the particular passageway. Paint or any other fluid component connected to that valve will then flow through the nipple or fitting 22 into secondary passageway 70 through the plug valve selected (in this case plug valve 16) into main passageway 50 for delivery to the hose connection 36 and subsequently through a hose to the spray gun. To change colors plug valve 16 would be closed by rotating handle 48 clockwise until limit pin 44 again abuts the stop 46 at the opposite end, closing off the secondary passageway 70 to the main passageway 50. At this time, plug valve 14, which is normally closed, would be opened, permitting a cleaning fluid or solvent from a solvent supply system (not shown) connected by a hose to fitting 20 would be allowed to purge the main passageways 50, 52, the hose fitting 36, and finally the spray gun (not shown). In order to prevent the fluid components delivered to the secondary passageway (which are usually at high pressure) from backing up into the solvent or the cleaning fluid, the fitting 20 includes a check valve, permitting flow only in the direction toward the spray gun. This effectively prevents contamination of the solvent through or around plug valve 14.

After the passageways and gun are purged of the previous paint selected, the plug valve 14 may then be closed. Note that the close proximity of the paint select plug valves to the main passageway substantially assures complete removal of any residual paint, preventing contamination of the next color and minimizing waste of paint. Another color may now be selected by opening either of plug valves 18, 26 or 28 permitting flow of a new color through the respective secondary passageways to the main passageway to the spray gun.

Thus, there has been disclosed a simple, modular, multi-color control system which can be easily expanded to accommodate any number of colors. This can be accomplished by simply adding additional modular auxiliary manifold assemblies up to the number of colors desired to be controlled. This can be done with a minimum of disassembly and reassembly. To add additional modules, the studs 40 are simply removed and the additional modules added in succession either between the last auxiliary manifold or onto the end of the last auxiliary manifold in the system. The latter is accomplished by simply removing the hose fitting 36 and adding the additional auxiliary manifolds end to end.

Obviously, many modifications and variations of the prevent invention are possible in light of the above teachings. It is therefore to be understood that the full scope of the invention is not limited to the details disclosed herein but may be practiced otherwise than as specifically described.

What is claimed is:

1. A modular multiple-fluid component selection and delivery system comprising:
   a first block;
   a main passageway passing through said first block;
   valve means in said first block at one end of said main passageway;
   a plurality of secondary passageways intersecting said main passageway;
   valve means intersecting each of said secondary said passageways for controlling the flow of the component to said main passageway;
   at least one auxiliary block attached to said first block having a planar face abutting a planar face on said first block;
   a main passageway in said auxiliary block in alignment with the main passageway in said first block;
   said at least one auxiliary block having a plurality of secondary passageways intersecting with said main passageway;
   aligning means automatically aligning the main passageway in said first block with the main passageway in said auxiliary blocks;
   sealing means sealing the transition of the main passageway from block to block; and
   a hose fitting attached to the end of the main passageway in the last of said plurality of blocks.

2. The modular system according to claim 1 wherein said valve means comprises:
   a plurality of bores through said first block and said at least one block, one of each of said bores intersecting respectively one of said main or secondary passageways; and
   a plug valve retained in each of said respective bores.

3. The modular system according to claim 2 wherein the bores in said secondary passageways are immediately adjacent the intersection of said secondary and said main passageways.

4. The modular system according to claim 1 including a check valve in said main passageway adjacent to said valve means.

5. The modular system according to claim 1 wherein said aligning means comprises:
   an aligning sleeve connecting the main passageway in said first block with the main passageway in said auxiliary block.

6. The modular system according to claim 5 including an O-ring sealing surrounding said sleeve for sealing the transition between the main passageways in the main block and auxiliary block.

7. The modular system according to claim 1 wherein said secondary passageways exit through the side of said first and at least one auxiliary block.

8. The modular system according to claim 7 including hose connecting means attached to said secondary passageway exits.

9. The modular system according to claim 1 including attachment means for attaching a plurality of auxiliary blocks in succession.

10. The modular system according to claim 9 wherein said attachment means comprises:
    a plurality of alignment means aligning the respective main passageways of each successive auxiliary block; and
    a plurality of studs passing through each of said auxiliary block and securing said auxiliary blocks in end-to-end relationship to said first block.

* * * * *